June 2, 1936.  W. H. DE LANCEY  2,043,035
LIQUID DISPENSING APPARATUS
Filed Feb. 26, 1935
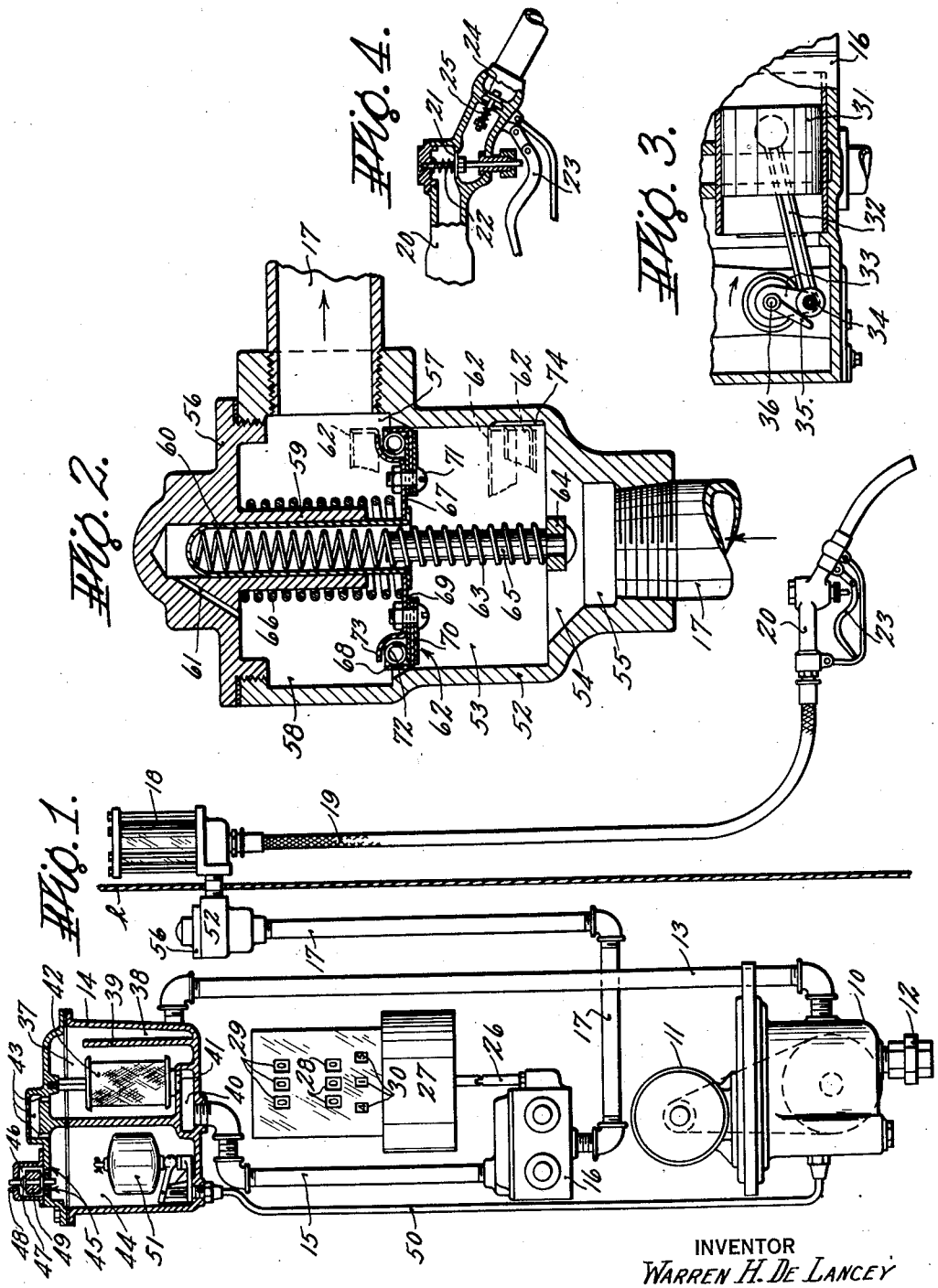
INVENTOR
*Warren H. De Lancey*
BY *Chapin + Neal*
ATTORNEYS Patented June 2, 1936

2,043,035

UNITED STATES PATENT OFFICE 2,043,035

LIQUID DISPENSING APPARATUS

Warren H. De Lancey, Springfield, Mass., assignor to Gilbert & Barker Manufacturing Company, West Springfield, Mass., a corporation of Massachusetts Application February 26, 1935, Serial No. 8,326

7 Claims. (Cl. 221—95)

This invention relates to improvements in liquid dispensing apparatus of the so-called wet hose, meter type, such as is now commonly used for dispensing measured quantities of gasoline, oils and the like.

The invention has for its principal object the provision of improved means for preventing the "milking" of the hose,—that is the extraction of small unmeasured quantities of liquid from the hose nozzle, while the pump is stopped, by winding up the hose to cause a decrease in its volumetric capacity and then unwinding it, or by any other manipulation of the hose which will have the same effect.

The invention also has for an object the provision of means for relieving expansion of liquid in the exposed portions of the delivery line, including the hose, and preventing the extraction of small unmeasured quantities of gasoline from the hose nozzle of the apparatus, under a condition where the gasoline drawn in cold into the exposed portions of the delivery line becomes heated up and expands, as it often does in hot weather.

A further object of the invention is the provision of means for maintaining, during the periods when the pump is not in operation, a small pressure on the gasoline in the visible discharge indicator, to avoid gasification of the liquid and the consequent appearance of an unfilled indicator.

These and other objects will best appear as the detailed description proceeds and will be pointed out in the appended claims.

The invention will be disclosed with reference to the accompanying drawing, in which:

Fig. 1 is an elevational view of a gasoline dispensing apparatus embodying the invention;

Fig. 2 is a sectional elevational view, drawn to a larger scale, of the pressure-regulating valve unit used in the delivery line;

Fig. 3 is a fragmentary sectional view of the meter; and

Fig. 4 is a fragmentary sectional view of the hose nozzle.

Referring to this drawing; the dispensing apparatus, as usually constructed, includes a suitable pump 10, driven by an electric motor 11. Gasoline from an underground tank (not shown), is drawn up by pump 10 through a suction pipe 12 and forced into and through a supply pipe 13 to an air separator 14, which is preferably located at the highest point in the dispensing system. From the separtor, gasoline flows through a supply pipe 15 to a meter 16 and thence by way of a delivery pipe 17 to a visible discharge indicator 18, to the outlet of which is connected the usual flexible hose 19. The hose terminates with a nozzle 20, having a valve 21 (Fig. 4), which automatically closes by a spring 22 and can be manually opened by a hand lever 23. The nozzle also has a check valve 24 which is held closed by a spring 25 and is opened by the pressure of the gasoline when such pressure is sufficient to overcome the force exerted by spring 25. The meter 16 drives, through a shaft 26, a suitable quantity-indicating means. In this case, such means comprises a register 27 of the "computing" type, having resettable dial wheels visible through openings 28 to show the quantity of gasoline dispensed; other resettable dial wheels visible through openings 29 to show the value of the gasoline dispensed; and non-resettable dial wheels visible through the openings 30 to show the total quantity of gasoline dispensed from the apparatus.

The apparatus described is customarily housed in except for the hose 19, nozzle 20, and indicator 18, and provided with the necessary appurtenances to control the motor 11, reset said dials, and so forth, all as shown for example in the Logan and De Lancey Patent No. 1,985,935, dated January 1, 1935. A portion of the housing is shown at $h$. However, a description of these elements is unnecessary to an understanding of the present invention and the illustration has therefore been confined to a showing of the necessary elements of the apparatus in a more or less schematic way.

The meter 16 is of any suitable displacement type and one example of a suitable type is contained in the above mentioned patent. Like the meter of such patent, the present meter contains provisions for lost motion somewhere in the transmission between the pistons, or other elements which are displaced by the gasoline, and the register 27. As set forth in that patent, the flexible hose 19 elongates by the pressure built up by pump 10 and when the pump is later stopped, the hose contracts, forcing gasoline back through the meter. This backward flow which occurs as a sudden surge and actuates the displacement elements of the meter, is made to create lost motion in said transmission and prevented from causing actuation of register 27. Then, when the pump 10 is started up with nozzle 20 closed, and hose 19 elongates (and thus increases in capacity), the initial operation of the displacement elements necessary to satisfy such increase in capacity, is utilized in taking up the lost motion in said transmission. Thus, the register is prevented from being actuated by changes in capacity in the delivery line (between the meter 16 and nozzle 20)

caused by expansion and contraction of the hose.

For example, as shown in Fig. 3, the meter 16 has displacement elements, one of which is shown as the piston 31. This piston drives through rod 32 a crank 33, having a pin 34, which is adapted when moved clockwise to abut and move an arm 35 fixed to a shaft 36. This shaft is mounted in alignment with the axis of crank 33 but has no connection therewith. Shaft 36 is one element in the transmission to register 27 and drives shaft 26. It will be clear from Fig. 3 that, when the hose expands as described, piston 31 moves to the left and turns crank 33 clockwise but arm 35 will not be turned until the lost motion between it and pin 34 is taken up. Also, a subsequent contraction of the hose will move piston 31 backward, causing its crank 33 to turn counterclockwise and thus drawing pin 34 away from arm 35 and re-creating lost motion.

The air separator 14 may likewise be of any suitable type. In addition to its primary function of freeing the gasoline of air and/or gas before its delivery to meter 16, it functions to relieve the pressure in pipe 15 and thus in the meter and in the delivery line, when the pump 10 is stopped. It includes a main chamber 37 and an inlet chamber 38, partitioned off from the main chamber 37 by a dam 39. Gasoline enters from pipe 13 into chamber 38 and rises therein until it overflows the top of dam 39 into chamber 37. The pipe 15 connects with a cored chamber 40 formed in the base of member 14. Connected to the inlet 41 of chamber 40 is an upstanding cylindrical screen 42, closed at its upper end. Gasoline must pass through screen 42 in order to reach inlet 41, chamber 40 and pipe 15. This screen prevents air bubbles and the like from passing to pipe 15. Consequently, the air and/or gas rises in chamber 37 and leaves by way of an air vent passage 43 into a trap chamber 44, formed alongside chamber 37 in member 14. The upper end of chamber 44 is normally vented to the atmosphere. Air rises through holes 45 into chamber 46, past an open valve 47 and through the outlet 48. A float 49 will move valve 47 and close the outlet 48, but this only occurs under unusual conditions when gasoline enters chamber 46. Normally valve 47 is open. Such liquid as passes with the air through vent passages 43 falls to the bottom of the trap chamber 44 and after it has accumulated to a certain level, is returned by way of a pipe 50 to the pump 10,— the action being controlled by a valve operated by float 51.

This invention depends upon the interposition in the delivery line 17 of the device shown in Fig. 2. In the embodiment shown, this device comprises a hollow casing 52 having in its lower portion a cylindrical bore, forming a cylinder 53. The lower end face of cylinder 53 is centrally recessed at 54 and this recess communicates with the inlet 55. The upper end of casing 52 is closed, preferably by the removable cap 56 as shown, and the outlet is a lateral one, shown at 57, near the upper end of casing 52 and above cylinder 53. The chamber 58 in casing 52 above cylinder 53, is likewise cylindrical and of somewhat larger diameter. The cap 56 has a long depending, hollow, cylindrical hub 59, in the bore of which is slidably mounted a piston rod 60 of hollow cylindrical form and having a closed upper end. A vent hole 61 connects the upper end of the bore in hub 59 to the upper end of chamber 58. Fixed to the lower end of rod 60 is a piston valve 62 of any suitable form, adapted to slide in cylinder 53 and closely fit the cylindrical wall thereof. A spring 63 acts between a cross bar 64 which spans recess 54, and the upper closed end of rod 60 to move piston 62 upwardly,—the upper end of this spring being received in the hollow rod 60 and the lower end thereof being coiled around a stud 65, upstanding from bar 64. A lighter spring 66 acts between cover 56 and the top face of piston valve 62 with a tendency to force the latter downwardly.

As herein shown, the piston valve 62 comprises a metal plate 67 fixed to rod 60 and a cupped piston leather 68, in part held between a pair of annular rings 69 and 70 of metal, which rings are secured at angularly spaced intervals by bolts 71 to plate 67. The free and upstanding part of the piston leather is pressed outwardly by suitable resilient means,—that shown being a suitable length of coil spring 72 bent into circular form. The outer end of plate 67 is bent upwardly and then outwardly as at 73 to retain the spring 72 in position.

The cylinder 53 is provided near its lower end with a by-pass 74 formed by an axially-directed recess in its cylindrical wall, of sufficient length so that when the piston valve 62 nears or reaches the lower end of its stroke gasoline may pass from the space above the piston valve to the space therebelow.

In operation, when pump 10 is running, the pressure of the liquid lifts piston valve 62 until the plate 67 thereof abuts the lower end of hub 59 or into the position shown by the upper set of dotted lines in Fig. 2. The spring 63 will thus be expanded and the spring 66 compressed. Gasoline will be dispensed through nozzle 20 when valve 21 is opened by lever 23,—the check valve 24 opening automatically because the pressure created by operation of pump 10 is greater than that which holds it closed. Merely as illustrative examples, it may be assumed that valve 24 opens on 5 pounds pressure and that the pump will establish a greater pressure, say 15 pounds, in hose 19. It is usual to start up the pump before opening valve 21. Consequently, the heavy pressure, built up in the hose, acting against the closed valve 21, will elongate the hose. However, as heretofore explained, the extra gasoline pumped into the hose to fill the increase in volume created by its elongation, will actuate the displacement elements of the meter 16 just enough to take up the lost motion, such as that between pin 34 and arm 35 in the register-driving transmission. Consequently, the register 27 will not be actuated to show this quantity. On stopping pump 10, after valve 21 has been closed, the pressure in the delivery line will be reduced because of the vent connection in the air separator 14. Hence, the hose will contract and push back into the meter a volume of gasoline substantially equal to that pushed into the hose when it elongated, and the displacement elements of the meter will be actuated to re-create the necessary degree of lost motion in the register-driving transmission, as by drawing pin 34 away from arm 35 to the degree shown in Fig. 3. The pressure in the delivery line drops rapidly and creates a sudden surge which actuates said displacement elements. The pressure in the delivery line soon drops to atmospheric pressure, with the exception of that portion of the line which includes the hose 19, visible discharge indicator 18 and that part of the space within casing 52 and above the piston valve 62. In the latter part of the system, it is desired to maintain a small pressure, less however than that necessary to open check valve 24, say for example 3½ pounds. Accordingly, the piston valve 62 moves down from its upper dotted line position into the position shown by full lines, or perhaps slightly below, and cuts off the hose section from the fixed section of the delivery line. The backward surge of the aforesaid volume of gasoline due to the contraction of the hose may drive the piston valve 62 down a short distance below the position shown by full lines but not very far. The spring 66, when compressed as described, is sufficient to drive the piston valve 62 into the full line position, being then superior to the then expanded spring 63.

One purpose of the invention is to prevent "milking" of the hose or the extraction of small quantities of gasoline from nozzle 20 by the imposition of severe tests made under unusual conditions. In one such test, the hose 19 is wound up on a mandrel of small diameter and the effect is to decrease the volumetric capacity of the hose by an appreciable amount, say 10 cubic inches for example. This volume of liquid is driven back into the delivery line. In the ordinary system this volume of liquid would pass back into and through the meter and into the air separator. The meter would be reversely actuated, creating additional lost motion in said register-driving transmission and thus not operating the register 21. Then the person making the test holds the nozzle valve 21 open and allows the hose to unwind. The result is a sudden and substantial increase in the volumetric capacity of the hose and gasoline rushes into it in a surge sufficient to open check valve 24 and allow gasoline to flow from the nozzle 20. The suction effect tends to draw into the hose more liquid than was displaced from the hose when it was wound up and substantial qualities of gasoline can be extracted in this manner. Needless to say, such quantities are not indicated on the register because the forward flow simply takes up the lost motion in the register-driving transmission created by the back flow.

Another test is to open the nozzle valve 21 after the hose and any other exposed portions of the delivery line have been well heated up. In pumps wherein there is no relief for expansion of gasoline in such exposed portions, the check valve 24 will be opened by the expansion of the liquid and gasoline extracted from the nozzle. In pumps wherein the hose is suspended from a long horizontal swing arm, this test will often result in the delivery of a substantial quantity of gasoline, more than the minimum volume which the authorities will allow. The swing arm substantially increases the volumetric capacity of the exposed portions of the delivery line which are exposed to the sun. Thus, if cold gasoline from the underground tank is pumped into the delivery line and allowed to remain there for a substantial time on a hot day, an error such as that described can be made to occur.

With the use of the piston valve 62, these difficulties are overcome. First, if expansion of gasoline occurs in the exposed portions of the delivery line, no substantial pressure can be built up in the hose. The piston valve 62 will be driven down far enough (to the lower dotted line position) so that liquid can by-pass by way of recess 74 into the non-exposed portions of the delivery line and through the meter into the air separator. It is to be noted that any such back flow of liquid is gradual and will leak past the piston and/or valves and not cause actuation of the register. It is also to be noted that the spring 63 when fully compressed, will exert a force of between 3½ and 4 pounds so that in no case can pressure be built up in the hose sufficient to open check valve 24.

For the winding test, the cylinder 53 has a capacity, before reaching the by-pass position shown by the lower set of dotted lines, at least equal to that by which the capacity of the hose can be decreased by the winding test. If, in a particular case, the volumetric capacity of the hose can be decreased 10 cubic inches, then the volumetric capacity of that portion of cylinder 53 between the piston valve 62 when positioned as shown by full lines and when positioned as shown by the next to the lowest set of dotted lines, is made the same. Therefore, when the hose is wound up the piston valve 62 moves downwardly, eventually reaching the position shown by the next to the lowest set of dotted lines. When the hose is unwound, the piston valve 62 moves upwardly and resumes its full line position. Meanwhile, the pressure in the hose remains unchanged and of a degree less than that necessary to open check valve 24.

And this result is obtained without necessitating any variation in the volume of the delivery line (between the meter 16 and nozzle 20). The delivery line remains filled with liquid. For example, when the piston valve 62 was pushed down by the back flow of say 10 cubic inches of gasoline, a like volume was pushed back through the meter 16, actuating the displacement elements thereof and creating additional lost motion in the register-driving transmission. And a like volume will pass into the air separator chamber 37. But as the piston valve 62 again moves upwardly, an equal volume of liquid flows from chamber 37, which is normally filled at least to the level of the top of dam 39, back through the meter 16 taking up the aforesaid lost motion, and into the delivery line.

The device 52 might be located at any point in the delivery line between the outlet of the meter and the inlet of the hose and still yield some of the useful results of this invention. However, the best location is considered to be that herein shown. When thus located, it maintains a pressure on the liquid in the visible discharge indicator, keeping it filled and preventing gasification of the liquid, which might otherwise occur and cause the indicator to appear only partly full.

The spring 66, aside from its function in moving piston valve 62 from open to closed position, assists by maintaining a certain degree of back pressure which is desirable for effective operation of the air separator. Around four pounds pressure must be built up before valve 62 will open and connect the inlet 55 to outlet 57.

The invention thus provides an important and valuable improvement for liquid dispensing apparatus of the type described, yielding an advance step in perfection of operation and preventing the extraction of unmeasured quantities of liquid from the apparatus.

What I claim is:

1. In liquid dispensing apparatus, a delivery conduit including a flexible hose, a nozzle on the delivery end of the hose, a valve in the nozzle automatically movable into position to close the nozzle, means for forcing liquid under a predetermined pressure through said conduit when said valve is opened, and closure means automatically operable when said liquid-forcing means stops to close off one section of said conduit including the hose from the remainder thereof and trap in said one section liquid under a pressure less than the first-named pressure and greater than atmospheric pressure, said closure means comprising cooperating elements capable of relative movement while maintaining the closure and forming an expansible and contractible chamber in free communication with the hose, expansible by the expansion of liquid in the hose or by the contraction of the volume of the hose and subsequently contractible by contraction of the liquid in the hose or by expansion of the volume of the hose, whereby the hose may be maintained at all times full of liquid at a pressure greater than atmospheric and substantially constant at the pressure at which it was trapped.

2. In liquid dispensing apparatus, a delivery conduit including a flexible hose, a visible discharge indicator interposed in said conduit near the inlet end of said hose, a nozzle on the delivery end of the hose, a valve in the nozzle automatically movable into position to close the nozzle, means for forcing liquid under a predetermined pressure through said conduit when said valve is opened, and closure means automatically operable when said liquid-forcing means stops to close off one section of said conduit including the visible discharge indicator and hose from the remainder thereof and trap in said one section liquid under a pressure less than the first-named pressure and greater than atmospheric pressure, said closure means comprising cooperating elements capable of relative movement while maintaining the closure and forming an expansible and contractible chamber in free communication with the hose, expansible by the expansion of liquid in the hose or by the contraction of the volume of the hose and subsequently contractible by contraction of the liquid in the hose or by expansion of the volume of the hose, whereby the visible discharge indicator and hose may be maintained at all times full of liquid at a pressure greater than atmospheric and substantially constant at the pressure at which it was trapped.

3. In liquid dispensing apparatus, a delivery conduit including a flexible hose, a nozzle on the delivery end of the hose, a valve in the nozzle automatically movable into position to close the nozzle, a check valve in the nozzle opening at a predetermined pressure to permit flow from the nozzle, means for forcing liquid at a pressure in excess of said predetermined pressure through said conduit when said valve is opened, and closure means automatically operable when said liquid-forcing means stops to close off one section of said conduit including the hose from the remainder thereof and trap in said one section liquid under a pressure less than the first-named pressure and greater than atmospheric pressure, said closure means comprising cooperating elements capable of relative movement while maintaining the closure and forming an expansible and contractible chamber in free communication with the hose, expansible by the expansion of liquid in the hose or by the contraction of the volume of the hose and subsequently contractible by contraction of the liquid in the hose or by expansion of the volume of the hose, whereby the hose may be maintained at all times full of liquid at a pressure greater than atmospheric and substantially constant at the pressure at which it was trapped.

4. In liquid dispensing apparatus, a delivery conduit including a flexible hose, a visible discharge indicator interposed in said conduit near the inlet end of said hose, a nozzle on the delivery end of the hose, a valve in the nozzle automatically movable into position to close the nozzle, a check valve in the nozzle opening at a predetermined pressure to permit flow from the nozzle, means for forcing liquid at a pressure in excess of said predetermined pressure through said conduit when said valve is opened, and closure means automatically operable when said liquid-forcing means stops to close off one section of said conduit including the visible discharge indicator and hose from the remainder thereof and trap in said one section liquid under a pressure less than the first-named pressure and greater than atmospheric pressure, said closure means comprising cooperating elements capable of relative movement while maintaining the closure and forming an expansible and contractible chamber in free communication with the hose, expansible by the expansion of liquid in the hose or by the contraction of the volume of the hose and subsequently contractible by contraction of the liquid in the hose or by expansion of the volume of the hose, whereby the visible discharge indicator and hose may be maintained at all time full of liquid at a pressure greater than atmospheric and substantially constant at the pressure at which it was trapped.

5. In a liquid dispensing apparatus, a meter, a delivery conduit extending from the meter and including a flexible hose, a nozzle on the hose having a check valve opening at a predetermined pressure to permit flow from the hose, means for forcing liquid through said meter and delivery conduit at a pressure in excess of said predetermined pressure, means operable when said forcing means stops to vent the meter end of the delivery conduit, a cylinder interposed in the delivery conduit between the meter and the hose having an inlet at one end and a lateral outlet near the other end, a piston valve cooperating with said cylinder, resilient means operable when said forcing means stops to move said piston valve in one direction into position to cut off said outlet from said inlet, whereby one section including the hose is cut off from the other and vented section, said resilient means being yieldable on the creation of pressure in the second-named section by the operation of said forcing means to allow the piston valve to move in the other direction and connect the inlet to the outlet, and resilient means opposing movement of the piston valve in the first-named direction beyond said position but yieldable to permit movement of said piston valve in such direction to other positions on expansion of the liquid in said hose or on contraction of the volume of said hose, said last-named resilient means effective on contraction of the liquid in the hose or on expansion of the volume thereof to move the piston valve in the second-named direction.

6. In a liquid dispensing apparatus, a meter, a delivery conduit extending from the meter and including a flexible hose, a nozzle on the hose having a check valve opening at a predetermined pressure to permit flow from the hose, means for forcing liquid through said meter and delivery conduit at a pressure in excess of said predetermined pressure, means operable when said forcing means stops to vent the meter end of the delivery conduit, a cylinder interposed in the delivery conduit between the meter and the hose having an inlet at one end and a lateral outlet near the other end, a piston valve cooperating with said cylinder, resilient means operable when said forcing means stops to move said piston valve in one direction into positon to cut off said outlet from said inlet, whereby one section including the hose is cut off from the other and vented section, said resilient means being yieldable on the creation of pressure in the second-named section by the operation of said forcing means to allow the piston valve to move in the other direction and connect the inlet to the outlet, and resilient means opposing movement of the piston valve in the first-named direction beyond said position but yieldable to permit movement of said piston valve in such direction to other positions on expansion of the liquid in said hose or on contraction of the volume of said hose, said last-named resilient means effective on contraction of the liquid in the hose or on expansion of the volume thereof to move the piston valve in the second-named direction, said cylinder having a volume between the first position and the extreme one of said other positions of the piston valve at least equal to that by which the volumetric capacity of said hose can be decreased by winding it.

7. In a liquid dispensing apparatus, a meter, a delivery conduit extending from the meter and including a flexible hose, a nozzle on the hose having a check valve opening at a predetermined pressure to permit flow from the hose, means for forcing liquid through said meter and delivery conduit at a pressure in excess of said predetermined pressure, means operable when said forcing means stops to vent the meter end of the delivery conduit, a cylinder interposed in the delivery conduit between the meter and the hose having an inlet at one end and a lateral outlet near the other end, a piston valve cooperating with said cylinder, resilient means operable when said forcing means stops to move said piston valve in one direction into position to cut off said outlet from said inlet, whereby one section including the hose is cut off from the other and vented section, said resilient means being yieldable on the creation of pressure in the second named section by the operation of said forcing means to allow the piston valve to move in the other direction and connect the inlet to the outlet, and resilient means opposing movement of the piston valve in the first-named direction beyond said position but yieldable to permit movement of said piston valve in such direction to other positions on expansion of the liquid in said hose or on contraction of the volume of said hose, said last-named resilient means effective on contraction of the liquid in the hose or on expansion of the volume thereof to move the piston valve in the second-named direction, said cylinder provided with a by-pass near its inlet end, said piston valve being movable in said cylinder in the first-named direction into an extreme position in which it is effectve to open said by-pass when the pressure in the first-named section of the delivery line exceeds a predetermined pressure less than that at which said check valve opens, whereby excessive pressures in said first-named section will be relieved by the passage of liquid from said section through said by-pass to the other section.

WARREN H. DE LANCEY.